(12) United States Patent
Kobori et al.

(10) Patent No.: US 11,433,860 B2
(45) Date of Patent: Sep. 6, 2022

(54) VEHICLE CONTROL APPARATUS AND VEHICLE EQUIPPED WITH VEHICLE CONTROL APPARATUS

(71) Applicant: HONDA MOTOR CO., LTD., Tokyo (JP)

(72) Inventors: Hidetoshi Kobori, Wako (JP); Nobuyuki Imaizumi, Wako (JP); Keizo Fuke, Wako (JP); Yoshinari Sugita, Wako (JP); Shoji Ichikawa, Wako (JP); Kohei Hanada, Wako (JP); Hiroaki Ninomiya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 522 days.

(21) Appl. No.: 16/545,335

(22) Filed: Aug. 20, 2019

(65) Prior Publication Data

US 2020/0062225 A1 Feb. 27, 2020

(30) Foreign Application Priority Data

Aug. 21, 2018 (JP) .............................. JP2018-154983

(51) Int. Cl.
*B60T 7/12* (2006.01)
*B60T 17/22* (2006.01)
(Continued)

(52) U.S. Cl.
CPC ................ *B60T 7/12* (2013.01); *B60T 17/22* (2013.01); *B60W 10/06* (2013.01);
(Continued)

(58) Field of Classification Search
USPC ........................................................ 701/70
See application file for complete search history.

(56) References Cited

U.S. PATENT DOCUMENTS 6,504,259 B1 * 1/2003 Kuroda .................... B60K 6/46
290/40 C
2011/0277728 A1 * 11/2011 Schoenek ............. F02D 41/042
123/320
(Continued)

FOREIGN PATENT DOCUMENTS

JP 2007-040254 A 2/2007
JP 2012-251465 A 12/2012
(Continued)

OTHER PUBLICATIONS

Japanese Office Action received in corresponding JP application No. 2018-154983 dated Nov. 26, 2019 with English translation (8 pages).

*Primary Examiner* — Tyler D Paige
(74) *Attorney, Agent, or Firm* — Rankin, Hill & Clark LLP

(57) ABSTRACT

A vehicle control apparatus includes: a VSA-ECU and an ESB-ECU that perform braking control to apply a braking torque in response to a brake operation by a driver of a host vehicle, and also perform brake holding control to hold the braking torque even when the brake operation is cancelled; and an engine control unit that performs idling stop control to stop driving of an engine that is a drive source of the host vehicle when a stop condition is satisfied, including that a vehicle speed of the host vehicle enters a predetermined low vehicle speed region, and also performs restart control to restart the engine when a predetermined restart condition is satisfied. The engine control unit prohibits execution of the idling stop control during execution of the brake holding control.

12 Claims, 9 Drawing Sheets

(51) Int. Cl.
*B60W 10/06* (2006.01)
*B60W 10/184* (2012.01)
*F02D 41/04* (2006.01)
*F02D 41/06* (2006.01)
*F02N 11/08* (2006.01)

(52) U.S. Cl.
CPC ......... *B60W 10/184* (2013.01); *F02D 41/042* (2013.01); *F02D 41/065* (2013.01); *F02N 11/0833* (2013.01); *B60W 2520/10* (2013.01); *B60W 2552/00* (2020.02); *F02N 2200/08* (2013.01); *F02N 2200/12* (2013.01)

(56) References Cited

U.S. PATENT DOCUMENTS

| | | | |
|---|---|---|---|
| 2015/0088405 A1* | 3/2015 | Iijima | B60W 20/50 |
| | | | 701/112 |
| 2017/0001640 A1 | 1/2017 | Asakura et al. | |
| 2020/0062225 A1* | 2/2020 | Kobori | B60W 10/06 |

FOREIGN PATENT DOCUMENTS

| | | | |
|---|---|---|---|
| JP | 2014-166843 A | 9/2014 | |
| JP | 2015-068191 A | 4/2015 | |
| JP | 2016-141236 A | 8/2016 | |
| JP | 2018-071465 A | 5/2018 | |
| WO | 2015118570 A1 | 8/2015 | |

\* cited by examiner

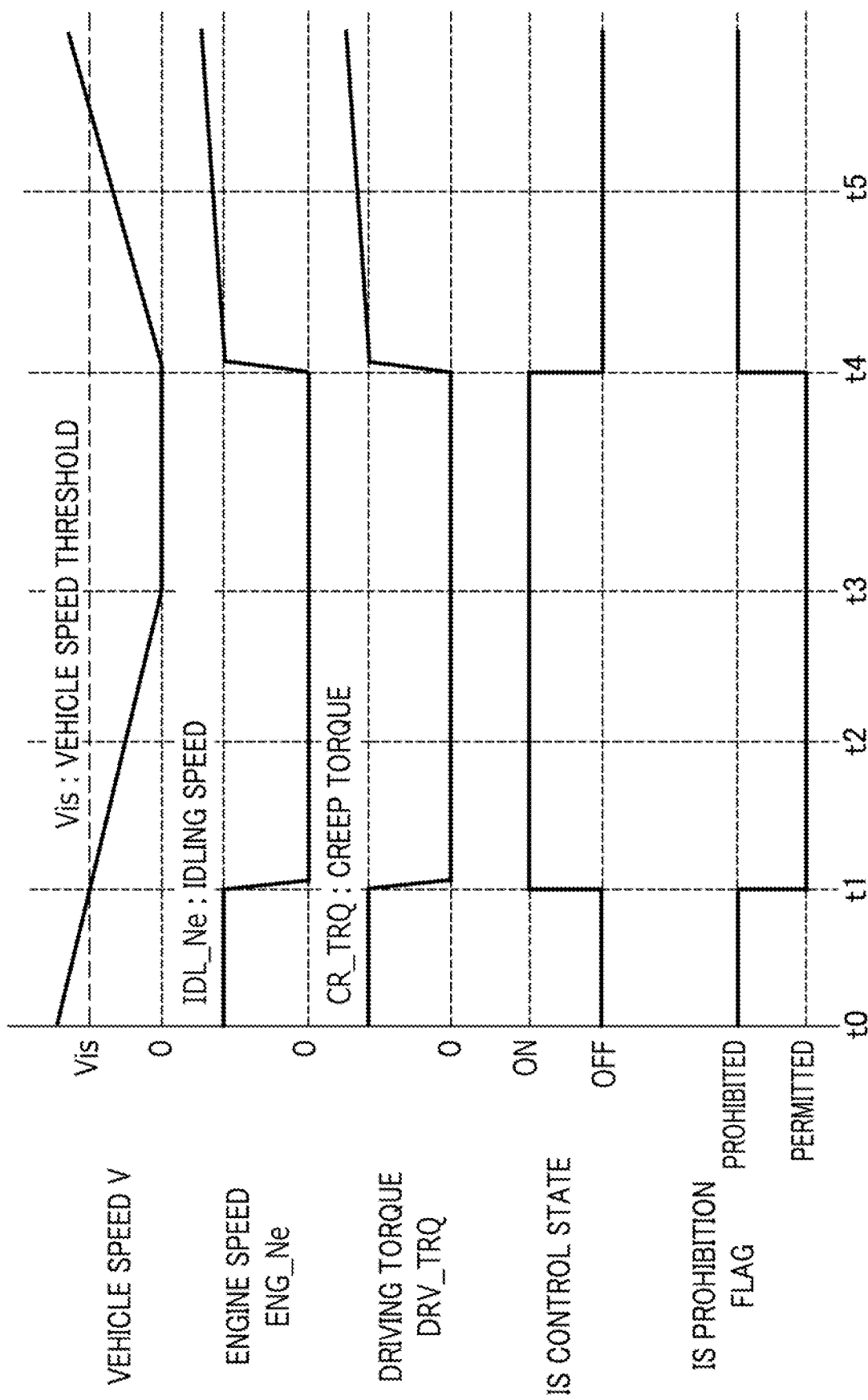

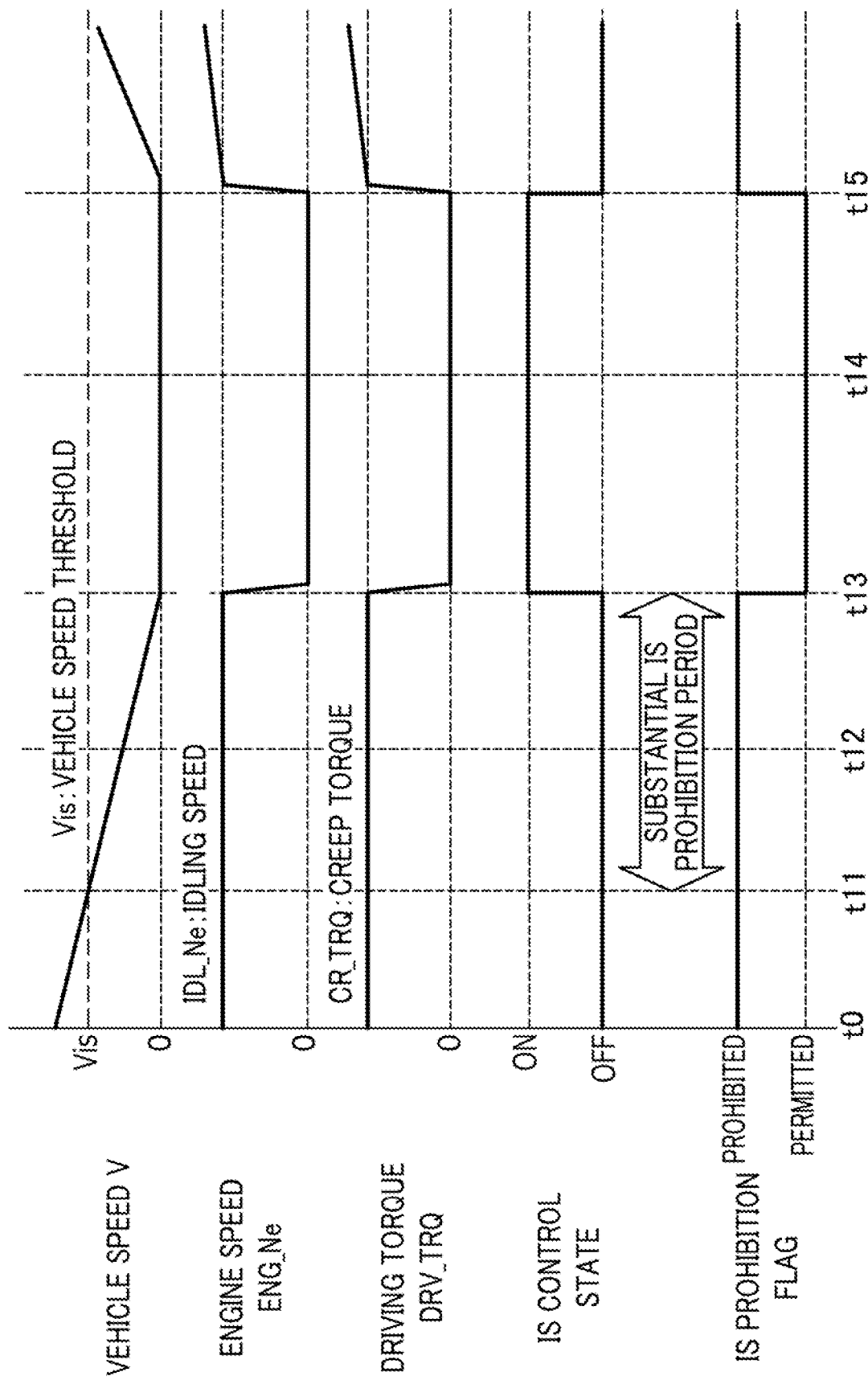

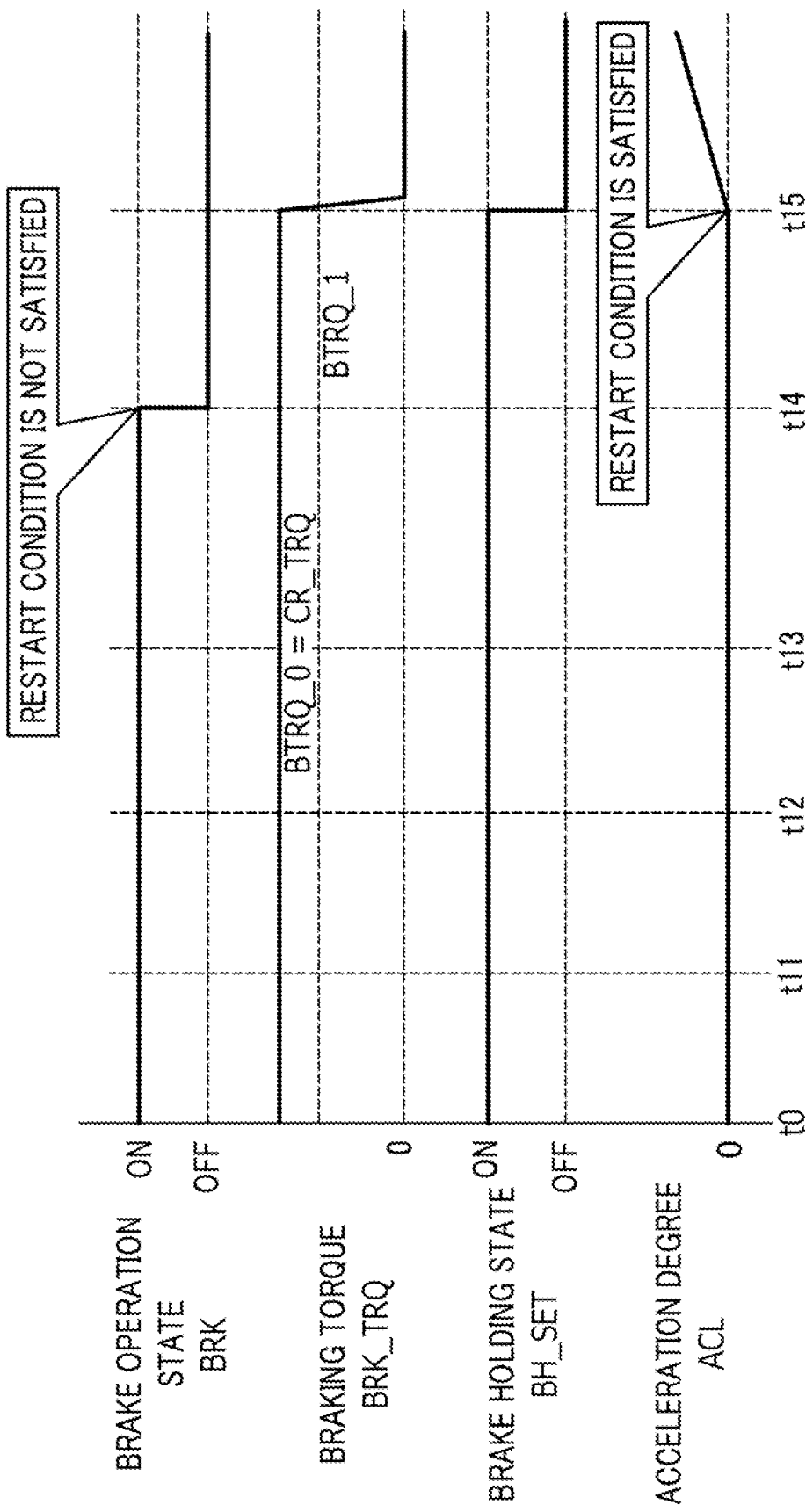

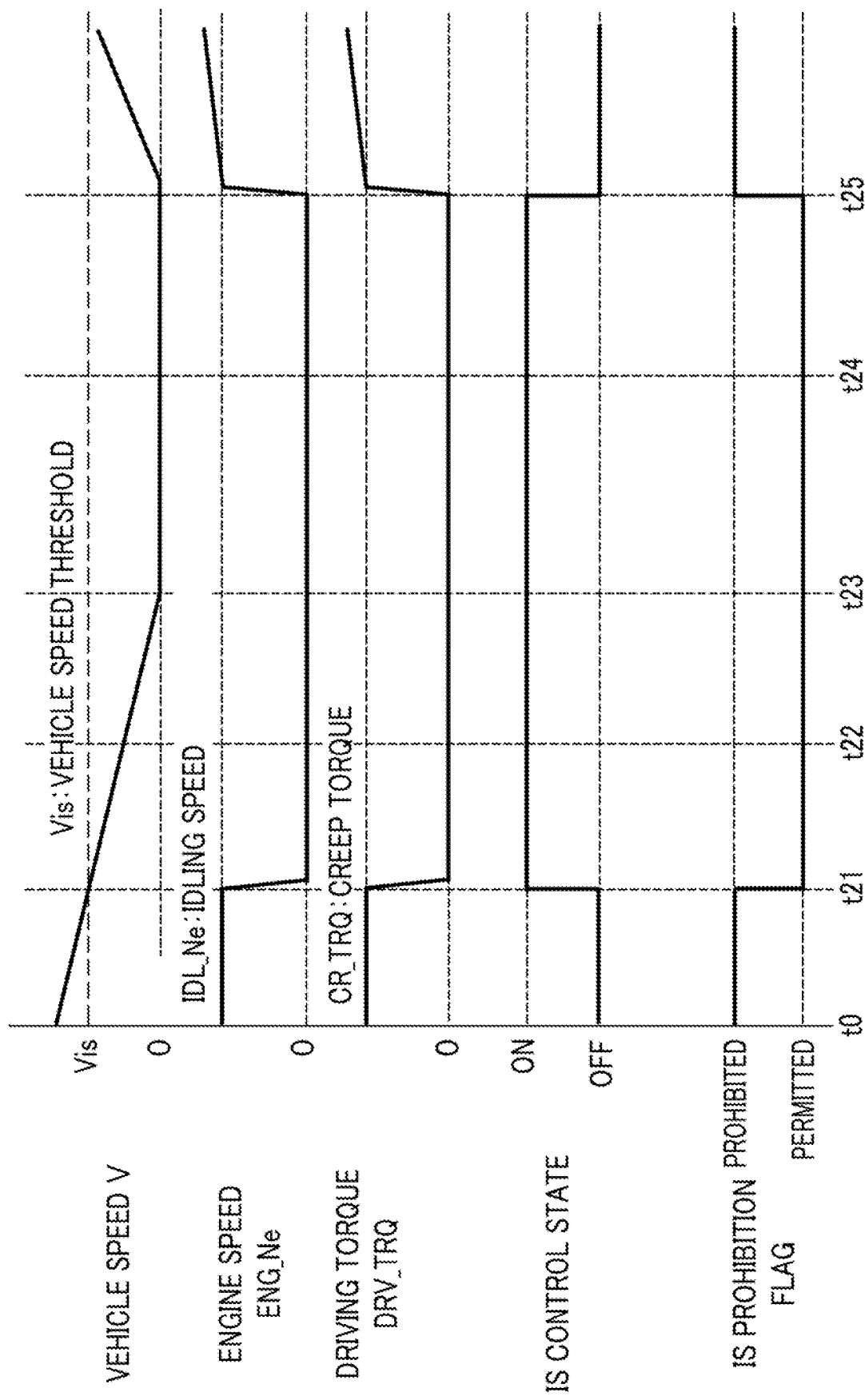

VEHICLE CONTROL APPARATUS AND VEHICLE EQUIPPED WITH VEHICLE CONTROL APPARATUS

BACKGROUND OF THE INVENTION

1. Field of the Invention

The present invention relates to a vehicle control apparatus having an idling stop function to stop an engine that is a drive source of a host vehicle when a predetermined stop condition is satisfied, and a vehicle including the vehicle control apparatus.

2. Description of the Related Art

There has heretofore been known a vehicle control apparatus having an idling stop (hereinafter "idling stop" may be abbreviated as "IS") control function to stop an engine that is a drive source of a host vehicle when a predetermined stop condition (for example, brakes are on at zero vehicle speed) is satisfied, aiming at fuel saving, emission reduction, vibration noise reduction, and the like.

As an example of such a vehicle control apparatus, the applicant of the present application discloses an invention of a vehicle control apparatus which controls a host vehicle by associating a follow-up control function to follow another vehicle traveling in front of the host vehicle with an IS control function (see, for example, Patent Document 1).

The vehicle control apparatus according to Patent Document 1 includes: an engine control unit that stops an engine that is a drive source of the host vehicle when a predetermined stop condition is satisfied, and also restarts the engine when a predetermined restart condition is satisfied; and a follow-up control unit that performs follow-up control to follow another vehicle traveling in front of the host vehicle when a predetermined follow-up control condition is satisfied. The engine control unit operates to change the stop condition or the restart condition for the engine while the follow-up control by the follow-up control unit is active, as compared with the case where the follow-up control is inactive.

To be specific, for example, when a condition that a road surface gradient is equal to or less than a predetermined gradient threshold is set as the engine stop condition when the follow-up control is inactive, the gradient threshold used as the engine stop condition to a lower gradient value while the follow-up control is active. That is, when the road surface gradient is used as the engine stop condition, engine stop timing is delayed while the follow-up control is active, as compared with the case where the follow-up control is inactive.

The vehicle control apparatus according to Patent Document 1 can prevent movement of the vehicle on a slope unexpected by a driver, for example, because traveling control of the host vehicle is performed by associating the follow-up control with the IS control.

The applicant of the present application also discloses an invention of a vehicle braking control apparatus with a function to perform control to keep holding the braking of the vehicle even when a brake operation by the driver is cancelled while applying a braking torque to the vehicle by operating either one of a motor cylinder device that generates a brake fluid pressure based on an electric signal corresponding to the brake operation according to the brake operation by the driver of the vehicle, and a VSA device that helps stabilize vehicle behavior based on the brake fluid pressure generated by the motor cylinder device (see, for example, Paragraphs 0023 and 0051 in Patent Document 2).

The vehicle braking control apparatus according to Patent Document 2 can reduce a load involved in the brake operation (brake pedal depression operation) by the driver when the vehicle is stopped for a traffic jam or a traffic light, for example, because control to keep holding the braking of the vehicle is performed even when the brake operation by the driver is cancelled.

PRIOR ART DOCUMENTS

Patent Document

Patent Document 1: WO2015/118570
Patent Document 2: Japanese Patent Application Publication No. 2014-166843

SUMMARY OF THE INVENTION

The vehicle control apparatus according to Patent Document 1 describes performing the IS control after waiting for the host vehicle to stop (see Paragraph 0033 in Patent Document 1). However, the vehicle control apparatus according to Patent Document 1 does not disclose or suggest performing the IS control (IS control during low vehicle speed traveling) when the vehicle speed of the host vehicle enters a predetermined low vehicle speed region.

It is assumed that a person skilled in the art attempts to apply the combination of the vehicle control apparatus that performs the IS control during low vehicle speed traveling with the control to keep holding the braking of the vehicle even when the brake operation by a driver is cancelled after the vehicle is stopped (brake holding control) according to Patent Document 2. In this case, a brake holding request based on the brake holding control and an engine restart request may occur redundantly in the vehicle control apparatus having the low vehicle speed traveling IS control and the brake holding control in combination.

Here, both the brake holding request based on the brake holding control and the engine restart request require relatively large power to meet the requests. Therefore, when the brake holding request and the restart request occur redundantly, the occupants might feel uncomfortable as any one of the requests is failed to be met due to power supply shortage.

In addition, when the brake holding request based on the brake holding control and the engine restart request are redundantly generated, there may occur a case where a creep torque generated by the restart of the engine exceeds the braking torque based on the brake holding request. Then, when the engine restarts, the vehicle starts moving (in this case, a brake holding request is generated for the purpose of suppressing the vehicle from moving). In this regard, again, the occupants might feel uncomfortable when the brake holding request based on the brake holding control and the engine restart request occur redundantly.

The present invention has been made to solve the above problems and makes it an object thereof to provide a vehicle control apparatus capable of realizing smooth vehicle control without making occupants feel uncomfortable by preventing a situation where a brake holding request based on brake holding control and an engine restart request are redundantly generated.

It is also an object of the present invention to provide a vehicle comprising a vehicle control apparatus capable of realizing smooth vehicle control without making occupants feel uncomfortable by preventing a situation where a brake holding request based on brake holding control and an engine restart request are redundantly generated.

In order to achieve the above object, the invention according to (1) includes: a braking control unit that performs braking control to apply a braking torque in response to a brake operation by a driver of a host vehicle, and also performs brake holding control to hold the braking torque even when the brake operation is cancelled; and an engine control unit that performs idling stop control to stop driving of an engine that is a drive source of the host vehicle when a stop condition is satisfied, including that a vehicle speed of the host vehicle enters a predetermined low vehicle speed region, and also performs restart control to restart the engine when a predetermined restart condition is satisfied. It is a key feature that the engine control unit prohibits the execution of the idling stop control during the execution of the brake holding control.

The vehicle control apparatus according to the present invention can realize smooth vehicle control without making the occupants feel uncomfortable by suppressing a situation where the brake holding request based on the brake holding control and the engine restart request are redundantly generated.

BRIEF DESCRIPTION OF THE DRAWINGS

FIG. 4A is a time chart showing temporal changes in vehicle speed, engine speed, driving torque, idling stop control state, and idling stop prohibition flag, for explaining the operations of the vehicle control apparatus when the brake holding control function is off (Comparative Example).

FIG. 5A is a time chart showing temporal changes in vehicle speed, engine speed, driving torque, idling stop control state, and idling stop prohibition flag, for explaining the operations of the vehicle control apparatus when the brake holding control function is on (Example).

FIG. 5B is a time chart showing temporal changes in brake operation state, braking torque, brake holding state, and acceleration degree, for explaining the operations of the vehicle control apparatus when the brake holding control function is on (Example).

FIG. 6A is a time chart showing temporal changes in vehicle speed, engine speed, driving torque, idling stop control state, and idling stop prohibition flag, for explaining the operations of the vehicle control apparatus when the brake holding control function is subsequently switched from OFF to ON (Example).

DETAILED DESCRIPTION OF THE EMBODIMENTS

Figure 1:
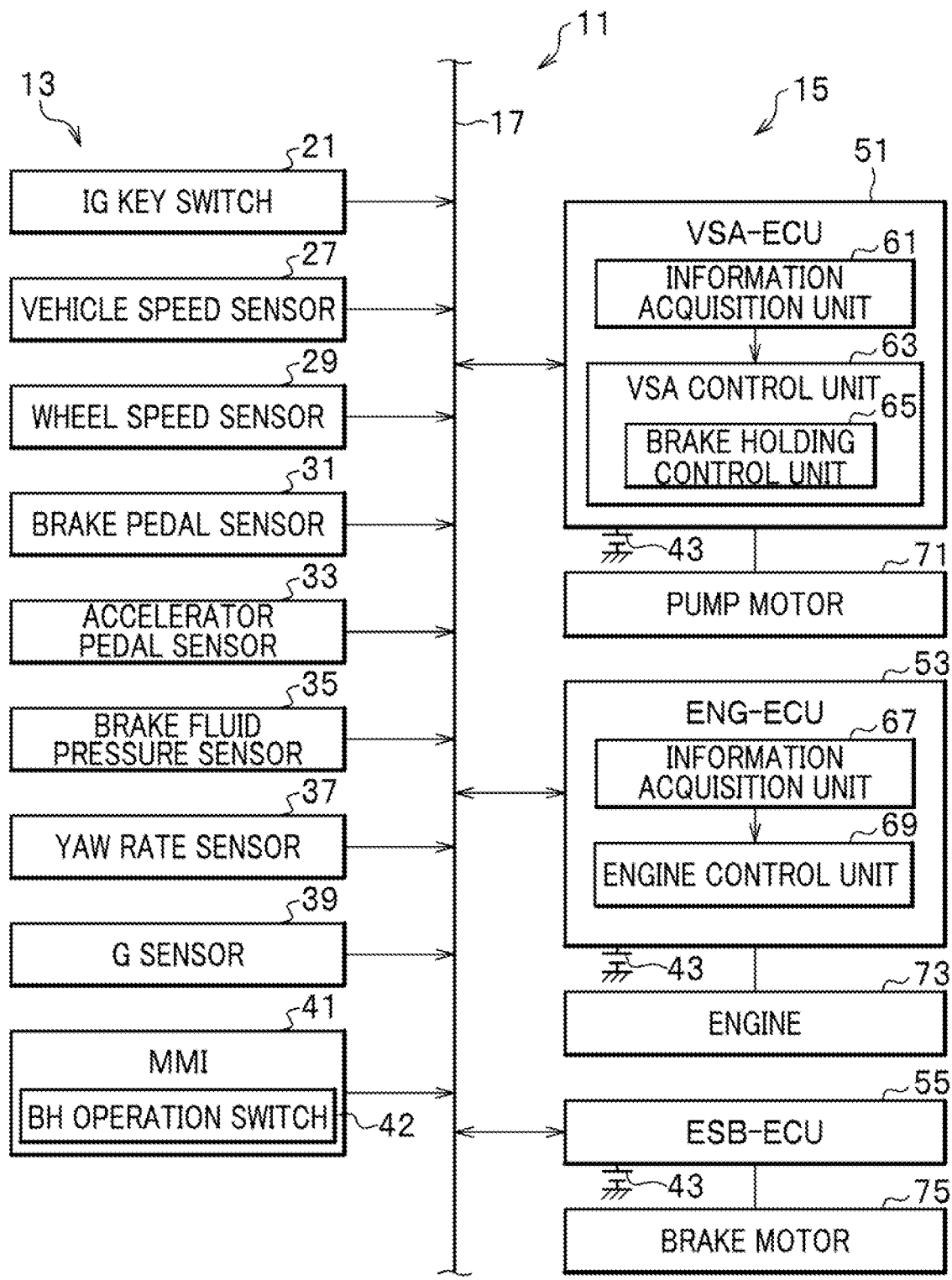
FIG. 1 is a block configuration diagram showing an overview of a vehicle control apparatus according to an embodiment of the present invention.

Hereinafter, a vehicle control apparatus according to an embodiment of the present invention will be described in detail with reference to the drawings as appropriate.

Note that, in the drawings described below, common reference symbols are used in principle for members having a common function or for members having corresponding functions. Further, for convenience of description, the sizes and shapes of the members may be schematically represented by deformation or exaggeration.

[Overview of Vehicle Control Apparatus 11 According to Embodiment of the Present Invention]

First, description is given of an overview of a vehicle control apparatus 11 according to an embodiment of the present invention with reference to FIG. 1. FIG. 1 is a block configuration diagram showing the overview of the vehicle control apparatus 11 according to the embodiment of the present invention.

The vehicle control apparatus 11 according to the embodiment of the present invention has a function to realize smooth vehicle control without making occupants of a vehicle feel uncomfortable by suppressing a situation where a brake holding request by a brake holding (BH) control function and a restart request for an internal combustion engine 73 (see FIG. 1) that is a drive source of a host vehicle (not shown) occur redundantly. The brake holding control function is described later in detail.

In order to realize the above-mentioned function, the vehicle control apparatus 11 according to the embodiment of the present invention is configured such that, as shown in FIG. 1, input system elements 13 and output system elements 15 are connected to each other so as to be capable of data communication through a communication medium 17 such as a controller area network (CAN), for example.

As shown in FIG. 1, the input system elements 13 include an ignition key switch (IG key switch) 21, a radar 23, a camera 25, a vehicle speed sensor 27, a wheel speed sensor 29, a brake pedal sensor 31, an accelerator pedal sensor 33, a brake fluid pressure sensor 35, a yaw rate sensor 37, a G sensor 39, and a man-machine interface (MMI) 41.

On the other hand, as shown in FIG. 1, the output system elements 15 include a VSA (vehicle stability assist; however, VSA is a registered trademark)-ECU 51, an ENG-ECU 53, and an ESB (electric servo brake)-ECU 55.

The ignition (IG) key switch 21 is a switch operated to supply a power source 43 to each of the electrical components mounted in the vehicle via an on-board secondary battery. When the IG key switch 21 is turned on, the power source 43 is supplied to the VSA-ECU 51, the ENG-ECU 53, and the ESB-ECU 55, respectively, to start the respective ECUs 51, 53, and 55.

In the vehicle control apparatus 11 according to the embodiment of the present invention, as illustrated in FIG. 1, one power source 43 mounted on the host vehicle is shared for the power source 43 of the VSA-ECU 51 used to execute the brake holding control and for the power source 43 of the ENG-ECU 53 used to perform restart control.

The vehicle speed sensor 27 has a function to detect a traveling speed (vehicle speed) V of the vehicle. Information on the vehicle speed V detected by the vehicle speed sensor 27 is sent to the ESB-ECU 55 and the like via the communication medium 17.

The wheel speed sensor 29 has a function to detect a rotation speed (wheel speed) of each wheel (not shown) provided in the host vehicle. Information on the wheel speeds of the respective wheels detected by the wheel speed sensor 29 is sent to the VSA-ECU 51 and the like via the communication medium 17.

The brake pedal sensor 31 has a function to detect an operation amount of a brake pedal (not shown) by a driver and a torque. Information on the operation amount of the brake pedal and the torque detected by the brake pedal sensor 31 is sent to the VSA-ECU 51, the ESB-ECU 55, and the like via the communication medium 17.

The accelerator pedal sensor 33 has a function to detect an operation amount of an accelerator pedal (not shown) by the driver. Information on the operation amount of the accelerator pedal detected by the accelerator pedal sensor 33 is sent to the VSA-ECU 51, the ENG-ECU 53, and the like via the communication medium 17.

The brake fluid pressure sensor 35 has a function to detect a brake fluid pressure in a fluid supply path of a VSA device (vehicle behavior stabilization device; not shown) in a brake fluid pressure system. Information on the fluid pressure in the fluid supply path of the VSA device detected by the brake fluid pressure sensor 35 is sent to the VSA-ECU 51, ESB-ECU 55, and the like via the communication medium 17.

The yaw rate sensor 37 has a function to detect a yaw rate generated in the host vehicle. Information on the yaw rate detected by the yaw rate sensor 37 is sent to the VSA-ECU 51 and the like via the communication medium 17.

The G sensor 39 has a function to detect a longitudinal direction G (longitudinal direction acceleration/deceleration) and a lateral direction G (lateral direction acceleration/deceleration) generated in the host vehicle. Information on the longitudinal direction G and the lateral direction G of the host vehicle detected by the G sensor 39 is sent to the VSA-ECU 51 and the like via the communication medium 17.

The man-machine interface (MMI) 41 includes an operation switch 42 (see FIG. 2) for brake holding (BH) control (hereafter referred to as the "BH operation switch"). The BH operation switch 42 is used to input setting information concerning the brake holding control function. ON/OFF setting information concerning the brake holding control function inputted by the BH operation switch 42 is sent to the VSA-ECU 51 and the like via the communication medium 17.

Figure 2:
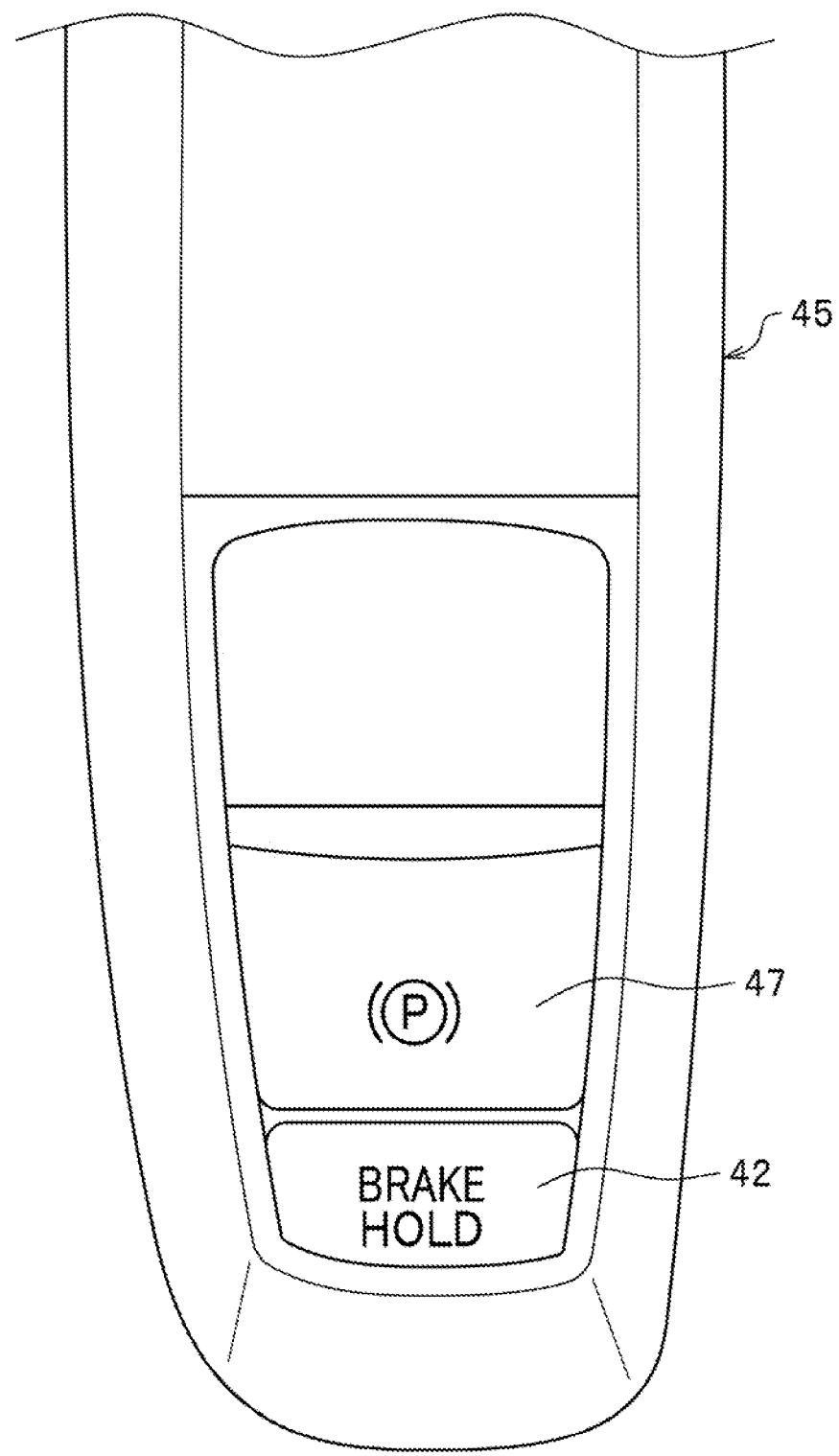
FIG. 2 is an external view around an operation switch related to a brake holding control function provided in a center console.

Here, a configuration around the BH operation switch 42 is described with reference to FIG. 2. FIG. 2 is an external view around the operation switch 42.

The BH operation switch 42 is provided in a center console 45, for example, as shown in FIG. 2. In the center console 45, next to the BH operation switch 42, an operation switch 47 of an electric parking brake to operate a brake pad by an electric actuator (not shown) is provided next to the BH operation switch 42.

Next, the brake holding control function is described. The brake holding control function is a function to perform control to continue holding of the braking torque even when the brake operation (brake pedal depression operation) by the driver is canceled when the vehicle is stopped. For example, a braking torque when the vehicle is stopped is employed as the braking torque related to the brake holding control when the vehicle is stopped.

The brake holding control is executed with the on-setting operation of the BH operation switch 42 as a trigger, and the execution thereof is released by the on-operation (pressing operation) of the accelerator pedal. The execution of the brake holding control to continue the holding of the braking torque when the vehicle is stopped is triggered and started when the vehicle is stopped and the brake operation by the driver is canceled.

Next, the output system elements 15 are described. As shown in FIG. 1, the VSA-ECU 51 included in the output system elements 15 includes an information acquisition unit 61 and a VSA control unit 63.

The VSA-ECU 51 is configured using a microcomputer including a central processing unit (CPU), a read only memory (ROM), a random access memory (RAM), and the like. This microcomputer reads and executes programs and data stored in the ROM, and operates to control execution of various functions including a function of the VSA-ECU 51 to acquire various information including ON/OFF setting information of the BH operation switch 42, and a VSA control function for attitude stabilization of the host vehicle.

The information acquisition unit 61 of the VSA-ECU 51 has a function to acquire various information including information concerning the vehicle speed V detected by the vehicle speed sensor 27, information concerning the wheel speed for each wheel detected by the wheel speed sensor 29, the information concerning the operation amount of the brake pedal and the torque detected by the brake pedal sensor 31, the information concerning the operation amount of the accelerator pedal detected by the accelerator pedal sensor 33, the information on the fluid pressure in the fluid supply path of the VSA device detected by the brake fluid pressure sensor 35, the information concerning the yaw rate detected by the yaw rate sensor 37, the information concerning the longitudinal G and lateral G of the host vehicle detected by the G sensor 39, and the ON/OFF setting information concerning the brake holding control function inputted through the BH operation switch 42 belonging to the man-machine interface (MMI) 41.

The VSA control unit 63 basically has a function to calculate a target fluid pressure for each wheel based on the various information acquired by the information acquisition unit 61, and drive a pressure pump (not shown) using a pump motor 71, thereby controlling the braking torque of the four wheels to the braking torque corresponding to the calculated target fluid pressure for each wheel. The VSA control unit 63 is configured including a brake holding control unit 65.

Note that, when a brake holding request based on the brake holding control and an engine restart request are redundantly generated and when a creep torque generated by restarting the engine exceeds the braking torque based on the brake holding request, the VSA control unit 63 operates to generate the brake holding request (to drive the pressure pump using the pump motor 71) for the purpose of suppressing the vehicle from moving.

The brake holding control unit 65 stores various information including ON/OFF setting information concerning the brake holding control function acquired by the information acquisition unit 61 and information on a brake holding flag indicating a control state as to whether or not the brake holding control is in execution. The brake holding control unit 65 has a function to perform brake holding control to continue holding the braking torque when the vehicle is stopped, based on such various kinds of information.

The ENG-ECU 53 includes an information acquisition unit 67 and an engine control unit 69.

The ENG-ECU 53 is configured using a microcomputer including a CPU, a ROM, a RAM, and the like. The microcomputer operates to read and execute programs and data stored in the ROM, and control execution of various functions of the ENG-ECU 53 including the engine control function.

The information acquisition unit 67 has a function to acquire information concerning the operation amount of the accelerator pedal detected by the accelerator pedal sensor 33, information concerning the rotation speed ENG_Ne of the engine 73, information concerning a fuel injection amount, and the like.

The engine control unit 69 has a function to perform drive control of the engine 73 according to the information concerning the operation amount of the accelerator pedal, the information concerning the engine speed ENG_Ne, the information concerning the fuel injection amount, acquired by the information acquisition unit 67, and the like. To be more specific, the engine control unit 69 operates to perform drive control of the engine 73 by controlling the opening degree of a throttle valve (not shown) for adjusting the intake amount of the engine 73, the fuel injection amount of an injector (not shown) for injecting a fuel gas, ignition timing of an ignition plug (not shown) for igniting the fuel, and the like.

Further, the engine control unit 69 stores information of an IS prohibition flag indicating a control state as to whether to prohibit or permit idling stop (IS). The engine control unit 69 has a function to perform IS control to stop the engine 73 that is the drive source of the host vehicle, when it can be considered that there is a driving intention to stop the driving of the engine 73 based on the information of the IS prohibition flag.

The information of the IS prohibition flag is set as follows. That is, when a predetermined stop condition for stopping the driving of the engine 73 is satisfied, "permitted" is set as the information of the IS prohibition flag. As the "predetermined stop condition", conditions may be employed such that, for example, a shift position is within a drive range, the vehicle speed V of the host vehicle is within a low vehicle speed range (vehicle speed V<vehicle speed threshold Vis), and the brake pedal is depressed and the accelerator pedal is not depressed.

On the other hand, when a predetermined prohibition condition for prohibiting the idling stop (IS) is satisfied, "prohibited" is set as the information of the IS prohibition flag. As the "predetermined prohibition condition", conditions may be employed as appropriate such that, for example, when the brake holding (BH) control is set to off, the vehicle speed V of the host vehicle exceeds the low vehicle speed range (vehicle speed V>vehicle speed threshold Vis), the brake holding (BH) control is set to ON, the brake pedal is not depressed, or the accelerator pedal is depressed.

However, the prohibition condition that the "brake holding (BH) control is set to ON" may be excluded from the prohibition condition when the host vehicle is in the stop state. This is described in detail later.

The engine control unit 69 also has a function to restart the engine 73 when a predetermined restart condition is satisfied. Here, as the "predetermined restart condition", conditions suggesting a driving intention of the driver may be employed as appropriate such that, for example, a foot comes off the brake pedal, the accelerator pedal is depressed, a steering wheel is operated, and the like. Note that the engine 73 is generally restarted using a starter motor (not shown) with large rated power consumption.

However, the restart condition that the "foot comes off the brake pedal: brake operation canceled" is excluded from the restart condition when the brake holding (BH) control is set to ON. This is described in detail later.

The ESB-ECU 55 is configured using a microcomputer including a CPU, a ROM, a RAM, and the like. The microcomputer operates to read and execute programs and data stored in the ROM, and to control execution of various functions of the ESB-ECU 55 including the brake control function.

The ESB-ECU 55 has a function to generate a brake fluid pressure (secondary fluid pressure) acting on a brake caliper (not shown) by driving a brake motor 75 to start a motor cylinder device (see, for example, Japanese Patent Application Publication No. 2015-110378: not shown) according to a brake fluid pressure (primary fluid pressure) generated in a master cylinder (not shown).

The VSA-ECU 51 and the ESB-ECU 55 correspond to the "brake control unit" of the present invention.

[Operation of Vehicle Control Apparatus 11 According to Embodiment of the Present Invention]

Figure 3:
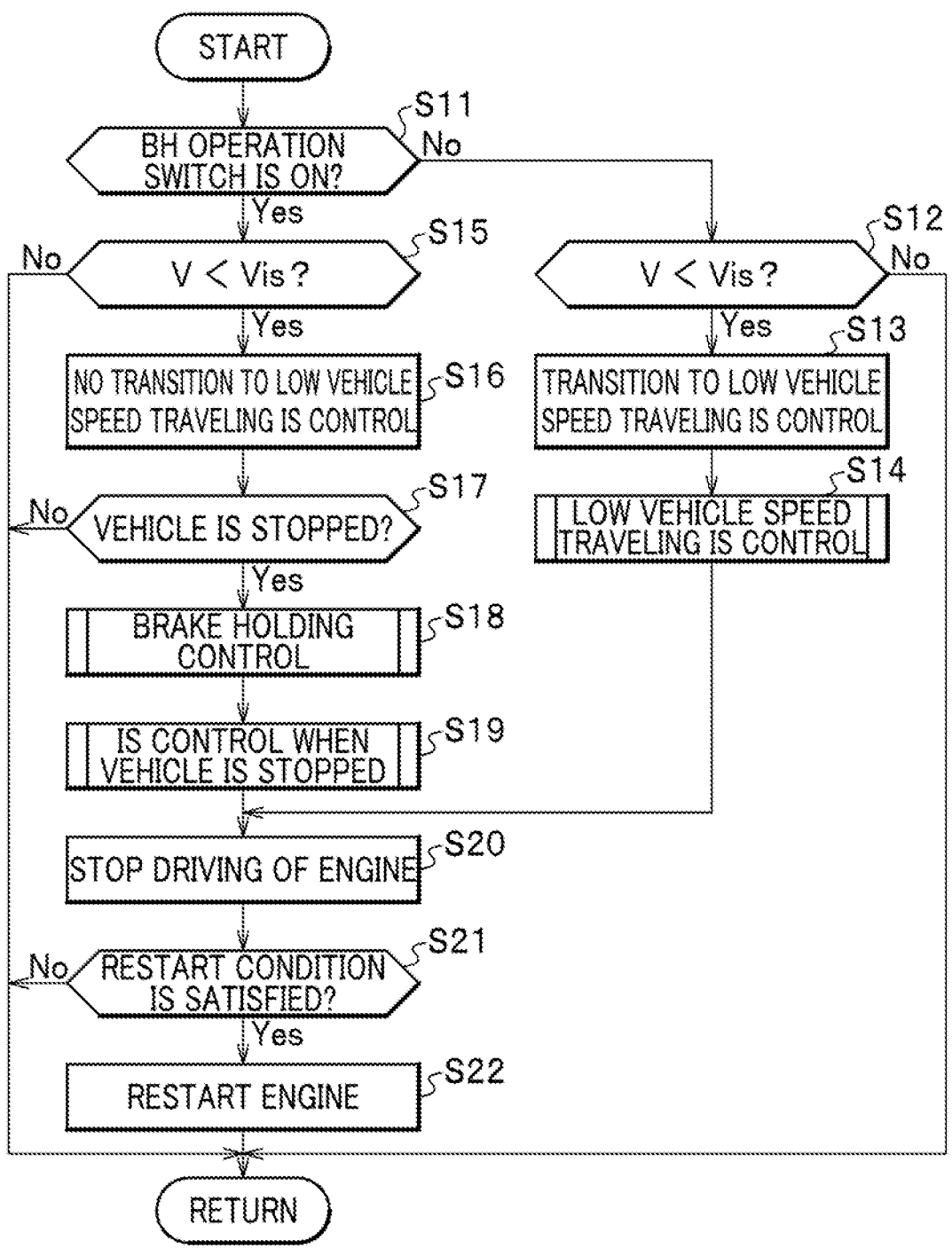
FIG. 3 is a flowchart for explaining operations of the vehicle control apparatus according to the embodiment of the present invention.

Next, with reference to FIG. 3, description is given of operations of the vehicle control apparatus 11 according to the embodiment of the present invention. FIG. 3 is a flowchart for explaining the operations of the vehicle control apparatus 11 according to the embodiment of the present invention.

In Step S11 shown in FIG. 3, the VSA-ECU 51 determines whether or not the BH operation switch 42 is set to ON. Here, the determination as to whether or not the BH operation switch 42 is set to ON is performed by referring to the ON/OFF setting information concerning the BH operation switch 42.

When it is determined that the BH operation switch 42 is not set to ON as a result of the determination in Step S11 (No in Step S11), the VSA-ECU 51 advances the processing flow to the next Step S12.

On the other hand, when it is determined that the BH operation switch 42 is set to ON as a result of the determination in Step S11 (Yes in Step S11), the VSA-ECU 51 jumps the processing flow to Step S15.

In Step S12, upon receipt of the information indicating that the BH operation switch 42 is not set to ON from the VSA-ECU 51, the ENG-ECU 53 determines whether or not the vehicle speed V of the host vehicle is less than a predetermined vehicle speed threshold Vis. Note that, as the predetermined vehicle speed threshold Vis, a low vehicle speed value (for example, about 10 Km/h) may be employed as appropriate, which can be considered that the host vehicle is about to stop.

When it is determined in Step S12 that the vehicle speed V of the host vehicle is less than the vehicle speed threshold Vis (Yes in Step S12), the ENG-ECU 53 advances the processing flow to the next Step S13.

On the other hand, when it is determined in Step S12 that the vehicle speed V of the host vehicle is not less than the vehicle speed threshold Vis (No in Step S12), the ENG-ECU 53 advances the processing flow to a return terminal.

In Step S13, the engine control unit 69 of the ENG-ECU 53 shifts a drive mode of the engine 73 to low vehicle speed traveling IS control. Note that the low vehicle speed traveling IS control is a control mode of stopping the driving of the engine 73 before the host vehicle is stopped, considering that the host vehicle is about to stop during low vehicle speed traveling when the vehicle speed V of the host vehicle falls below the vehicle speed threshold Vis (enters the low vehicle speed range).

In Step S14, the engine control unit 69 of the ENG-ECU 53 performs the low vehicle speed traveling IS control to stop the driving of the engine 73 before the host vehicle stops.

On the other hand, upon receipt of the information indicating that the BH operation switch 42 is set to ON from the VSA-ECU 51 as a result of the determination in Step S11, the ENG-ECU 53 determines in Step S15 whether or not the vehicle speed V of the host vehicle is less than a predetermined vehicle speed threshold Vis (enters the low vehicle speed range), as in Step S12.

When it is determined that the vehicle speed V of the host vehicle is less than the vehicle speed threshold Vis (within the low vehicle speed range) as a result of the determination in Step S15 (Yes in Step S15), the ENG-ECU 53 advances the processing flow to the next Step S16.

On the other hand, when it is determined that the vehicle speed V of the host vehicle is not less than the vehicle speed threshold Vis (not within the low vehicle speed range) as a result of the determination in Step S15 (No in Step S15), the ENG-ECU 53 advances the processing flow to the return terminal.

In Step S16, the engine control unit 69 of the ENG-ECU 53 does not shift the drive mode of the engine 73 to the low vehicle speed traveling IS control. As a result, in the processing flow after Step S16, the driving of the engine 73 is not stopped before the vehicle stops. Note that, in order to prevent the drive mode of the engine 73 from being shifted to the low vehicle speed traveling IS control, an IS prohibition flag is referred to, indicating a control state as to whether to prohibit or permit the idling stop (IS).

In Step S17, the VSA-ECU 51 determines whether or not the host vehicle is stopped.

When it is determined that the host vehicle is stopped as a result of the determination in Step S17 (Yes in Step S17), the VSA-ECU 51 advances the processing flow to the next Step S18.

On the other hand, when it is determined that the host vehicle is not stopped as a result of the determination in Step S17, (No in Step S17), the VSA-ECU 51 advances the processing flow to the return terminal.

Having determined that the host vehicle is stopped, the VSA-ECU 51 acquires a braking torque when the vehicle is stopped and starts execution of the brake holding control in Step S18. However, the execution of the brake holding control to continue to actually hold the braking torque when the vehicle is stopped is triggered and started when the brake operation is canceled. Thereafter, the VSA-ECU 51 advances the processing flow to the next Step S19. Note that, in order to manage the current state of the brake holding control, a brake holding flag is used, indicating a control state as to whether or not the brake holding control is in execution.

In Step S19, the engine control unit 69 of the ENG-ECU 53 performs stop IS control to stop the driving of the engine 73 when the vehicle is stopped. The ENG-ECU 53 then advances the processing flow to the next Step S20.

Upon receipt of the information indicating that the host vehicle is stopped from the VSA-ECU 51, the engine control unit 69 of the ENG-ECU 53 performs control to stop the driving of engine 73 in Step S20. Thus, the driving of the engine 73 is stopped. The ENG-ECU 53 then advances the processing flow to the next Step S21.

In Step S21, the engine control unit 69 of the ENG-ECU 53 determines whether or not the restart condition for the engine 73 is satisfied. Here, the determination that the restart condition for the engine 73 is satisfied is made when information indicating that the accelerator pedal is depressed is acquired, or the like.

When it is determined that the restart condition for the engine 73 is satisfied as a result of the determination in Step S21, (Yes in Step S21), the ENG-ECU 53 advances the processing flow to the next Step S22.

On the other hand, when it is determined that the restart condition for the engine 73 is not satisfied as a result of the determination in Step S21 (No in Step S21), the ENG-ECU 53 advances the processing flow to the return terminal.

In Step S22, the engine control unit 69 of the ENG-ECU 53 restarts the engine 73. Thus, the engine 73 is restarted. The ENG-ECU 53 then advances the processing flow to the return terminal.

[Time-Series Operation of Vehicle Control Apparatus 11 According to Embodiment of the Present Invention]

Next, with reference to FIGS. 4A, 4B, 5A, 5B, 6A, and 6B as appropriate, description is given of a time-series operation of the vehicle control apparatus 11 according to the embodiment of the present invention.

Figure 4B:
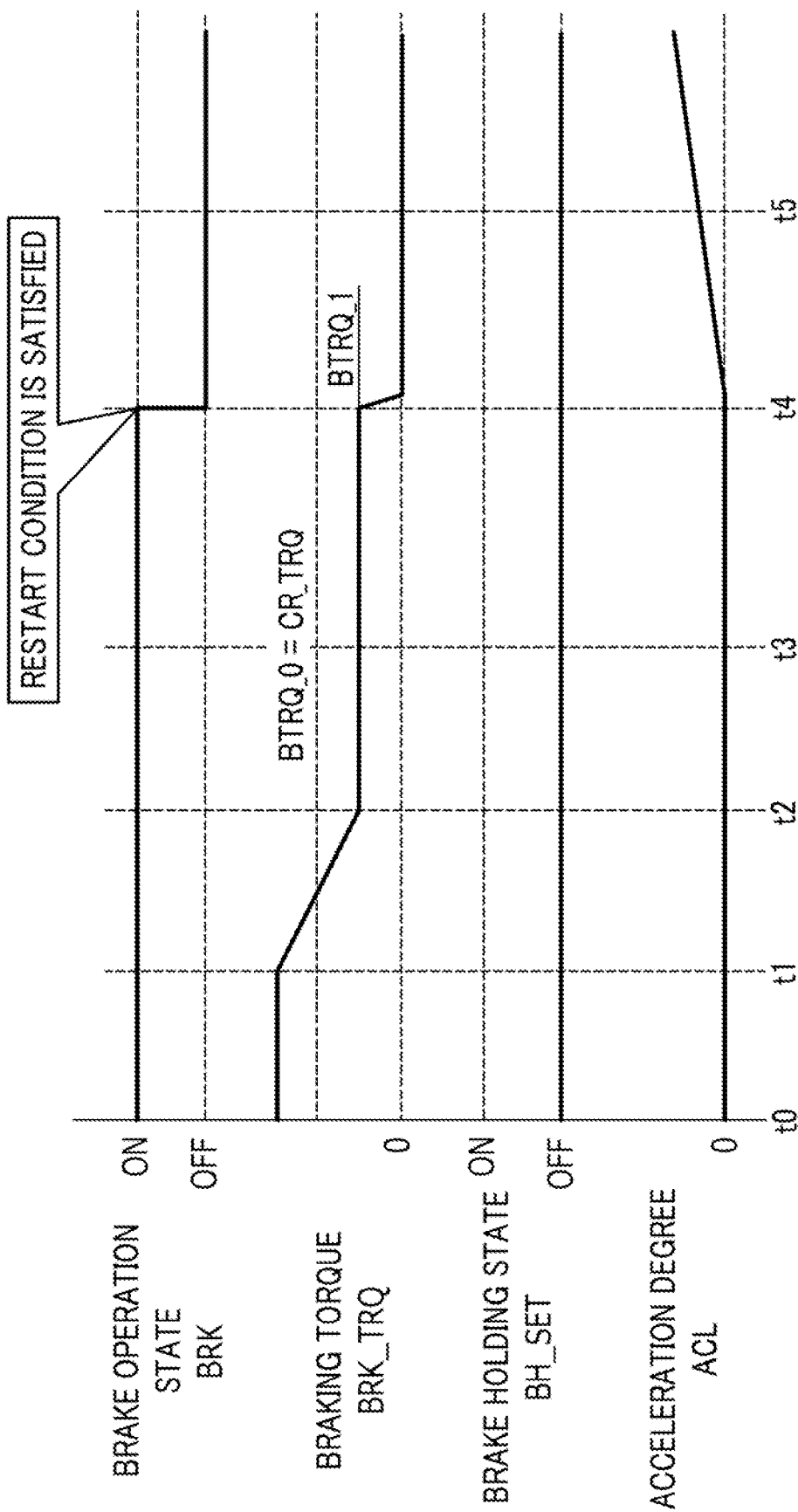
FIG. 4B is a time chart showing temporal changes in brake operation state, braking torque, brake holding state, and acceleration degree, for explaining the operations of the vehicle control apparatus when the brake holding control function is off (Comparative Example).

First, with reference to FIGS. 4A and 4B, description is given of a time-series operation of the vehicle control apparatus 11 when the brake holding (BH) control function is OFF (Comparative Example).

FIGS. 4A and 4B are time charts showing temporal changes in vehicle speed V, engine speed ENG_Ne, driving torque DRV_TRQ, IS control state, IS prohibition flag, brake operation state BRK, braking torque BRK_TRQ, brake holding state BH_SET, and acceleration degree ACL, respectively, for explaining the operation of the vehicle control apparatus 11 when the brake holding (BH) control function is OFF (Comparative Example).

From time t0 to t1 shown in FIG. 4A, the vehicle speed V of the host vehicle linearly and gradually decreases from a value exceeding the vehicle speed threshold Vis to a low vehicle speed range with the vehicle speed threshold Vis as the upper limit. In this event, the engine speed ENG_Ne maintains an idling speed IDL_Ne. The driving torque DRV_TRQ of the engine 73 maintains a creep torque CR_TRQ. The IS control state representing the ON/OFF state of the idling stop control is in the OFF state. The IS prohibition flag indicating the control state as to whether to prohibit or permit the IS is in the prohibited state.

From time t0 to t1 shown in FIG. 4B, the brake operation state BRK representing the brake operation (brake pedal depression operation) state is in the ON state (state where the brake pedal is depressed). The braking torque DRV_TRQ representing the magnitude of the braking force acting on the wheels maintains a value exceeding the critical braking torque value BTRQ_0 (=creep torque CR_TRQ) that matches with the creep torque CR_TRQ. The brake holding state BH_SET representing the ON/OFF setting state of the brake holding (BH) control is in the OFF setting state. The acceleration degree ACL indicating the degree of depression of the accelerator pedal is in the OFF state (state where the accelerator pedal is not depressed).

Note that the brake holding state BH_SET corresponds to the information of the brake holding flag indicating the control state as to whether or not the brake holding control is in execution.

From time t1 to t3 shown in FIG. 4A, the vehicle speed V of the host vehicle linearly and gradually decreases until the vehicle speed becomes zero (stop state) at time t3 even after entering the low vehicle speed range with the vehicle speed threshold Vis as the upper limit at time t1. In this event, the engine speed ENG_Ne rapidly decreases from the idling speed IDL_Ne to zero immediately after time t1, and then maintains the zero state (driving stop state of the engine 73). Likewise, the drive torque DRV_TRQ of the engine 73 also rapidly decreases from the creep torque CR_TRQ to zero immediately after time t1, and then maintains the zero state. The IS control state transits from the OFF state to ON state at time t1, and then maintains the ON state at time t1 to t3. The IS prohibition flag transits from the prohibited state to the permitted state at time t1, and then maintains the permitted state from time t1 to t3.

From time t1 to t3 shown in FIG. 4B, the brake operation state BRK is maintained in the ON state. After the braking torque DRV_TRQ linearly and gradually decreases from a value exceeding the critical braking torque value BTRQ_0 to an intermediate braking torque value BTRQ_1 below the same value BTRQ_0 from time t1 to t2, the intermediate braking torque value BTRQ_1 is maintained from time t2 to t3. The brake holding state BH_SET is maintained in the OFF setting state. The acceleration degree ACL also maintains the OFF state.

The intermediate braking torque value BTRQ_1 is a value corresponding to the brake operation by the driver, which is required to keep the host vehicle under the IS control in the stop state. The intermediate braking torque value BTRQ_1 is generally smaller than the creep torque CR_TRQ by the diminished amount of the creep torque CR_TRQ by the IS control, although it depends on the stop state of the host vehicle (whether or not the road is sloping).

Here, there are two things to be noted at time t1 to t3.

First, on the premise that the brake operation state BRK is ON (state where the brake pedal is depressed), the low vehicle speed traveling IS control is executed with the vehicle speed V during deceleration entering the low vehicle speed range (vehicle speed V<vehicle speed threshold Vis) as a trigger at time t1. In the example shown in FIG. 4A, the period from time t1 to t3 corresponds to the execution period of the low vehicle speed traveling IS control.

Secondly, the IS control state transits from the OFF state to ON state at time t1, and then the ON state is maintained from time t1 to t3. Such an action is realized by the IS prohibition flag being in the permitted state at the same time t1 to t3. Note that, at time t1, the IS prohibition flag transits from the prohibited state to the permitted state because the brake holding state BH_SET is in the OFF setting state and, as described above, the vehicle speed V during deceleration enters the low vehicle speed range at time t1.

From time t3 to t4 shown in FIG. 4A, the vehicle speed V of the host vehicle is maintained at zero (stop state). In this event, the engine speed ENG_Ne maintains a zero state (driving stop state of the engine 73). Likewise, the drive torque DRV_TRQ of the engine 73 also maintains a zero state. The IS control state is maintained in the ON state. The IS prohibition flag maintains the permitted state.

From time t3 to t4 shown in FIG. 4B, the brake operation state BRK is maintained in the ON state. The braking torque DRV_TRQ maintains an intermediate braking torque value BTRQ_1. The brake holding state BH_SET is maintained in the OFF setting state. The acceleration degree ACL also maintains the OFF state.

From time t4 to time t5 shown in FIG. 4A, the vehicle speed V of the host vehicle linearly and gradually increases from zero (stop state) to a value exceeding the vehicle speed threshold Vis, starting from the time shortly after time t4. In this event, the engine speed ENG_Ne rapidly increases from zero to the idling speed IDL_Ne immediately after time t4, and then linearly and gradually increases to a value exceeding the idling speed IDL_Ne. Likewise, the drive torque DRV_TRQ of the engine 73 also rapidly increases from zero to the creep torque CR_TRQ immediately after time t4, and then linearly and gradually increases to a value exceeding the creep torque CR_TRQ. The IS control state transits from the ON state to the OFF state at time t4, and then maintains the OFF state. The IS prohibition flag transits from the permitted state to the prohibited state at time t4, and then maintains the prohibited state.

From time t4 to t5 shown in FIG. 4B, the brake operation state BRK transits from the ON state to the OFF state at time t4, and then maintains the OFF state. The braking torque DRV_TRQ rapidly decreases from the intermediate braking torque value BTRQ_1 to zero at time t4 and then maintains zero. The brake holding state BH_SET is maintained in the OFF setting state. The acceleration degree ACL linearly and gradually increases from zero (stop state), starting from a time shortly after time t4.

There is one thing to be noted at time t4 shown in FIG. 4B. That is, in synchronization with the transition of the brake operation state BRK from the ON state to the OFF state at time t4, the engine speed ENG_Ne rapidly increases from zero to the idling speed IDL_Ne. This is because, during the period when the brake holding control function is set to OFF, execution of the brake holding control is not triggered or started by a foot coming off the brake pedal. Therefore, the foot coming off the brake pedal can be adopted as the restart condition for the engine 73.

Next, with reference to FIGS. 5A and 5B, description is given of a time-series operation of the vehicle control apparatus 11 when the brake holding (BH) control function is ON (Example).

FIGS. 5A and 5B are time charts showing temporal changes in vehicle speed V, engine speed ENG_Ne, driving torque DRV_TRQ, IS control state, IS prohibition flag, brake operation state BRK, braking torque BRK_TRQ, brake holding state BH_SET, and acceleration degree ACL, respectively, for explaining the operation of the vehicle control apparatus 11 when the brake holding (BH) control function is ON (Example).

From time t0 to t11 shown in FIG. 5A, the vehicle speed V of the host vehicle linearly and gradually decreases from a value exceeding the vehicle speed threshold Vis to a low vehicle speed range with the vehicle speed threshold Vis as the upper limit. In this event, the engine speed ENG_Ne maintains the idling speed IDL_Ne. The driving torque DRV_TRQ of the engine 73 maintains the creep torque CR_TRQ. The IS control state is in the OFF state. The IS prohibition flag is in the prohibited state.

From time t0 to t11 shown in FIG. 5B, the brake operation state BRK is in the ON state (state where the brake pedal is depressed). The braking torque DRV_TRQ linearly and gradually decreases from a value exceeding the critical braking torque value BTRQ_0 (=CR_TRQ) to a critical braking torque value BTRQ_0. The brake holding state BH_SET is in the ON setting state. The acceleration degree ACL is in the OFF state (state where the accelerator pedal is not depressed).

From time t11 to t13 shown in FIG. 5A, the vehicle speed V of the host vehicle linearly and gradually decreases until the vehicle speed reaches zero (stop state) at time t13 even after entering the low vehicle speed range with the vehicle speed threshold Vis as the upper limit at time t11. In this event, the engine speed ENG_Ne maintains the idling speed IDL_Ne. Likewise, the drive torque DRV_TRQ of the engine 73 also maintains the creep torque CR_TRQ. The IS control state is maintained in the OFF state. The IS prohibition flag also maintains the prohibited state.

From time t11 to t13 shown in FIG. 5B, the brake operation state BRK is maintained in the ON state. The braking torque DRV_TRQ maintains a value exceeding the critical braking torque value BTRQ_0. The brake holding state BH_SET is maintained in the ON setting state. The acceleration degree ACL is maintained in the OFF state.

Here, there is something to be noted at time t11 to t13. That is, when the brake operation state BRK is in the ON state (state where the brake pedal is depressed), the low vehicle speed traveling IS control is not executed even though the vehicle speed V during deceleration enters the low vehicle speed range (vehicle speed V<vehicle speed threshold Vis) at time t11. This is because the IS prohibition flag is maintained in the prohibited state from time t11 to t13 (because the brake holding state BH_SET is in the ON setting state at time t11).

Note that the period from time t11 to t13 can be said to be substantially an IS prohibition period in the sense that the IS prohibition flag is in the permitted state if the brake holding state BH_SET is in the OFF setting state.

The reason why the period from time t11 to t13 is set as the substantial IS prohibition period as described above is as follows. That is, if the low vehicle speed traveling IS control is executed while the brake holding state BH_SET is in the ON setting state, a brake holding request by the brake holding control function and a restart request for the engine 73 occur redundantly. This might cause the occupants of the host vehicle to feel uncomfortable without being able to meet any one of the requests due to power supply shortage.

Here, the brake holding state BH_SET being in the ON setting state is synonymous with the brake holding control being in execution. Meanwhile, in the example shown in FIG. 5B, the period from time t0 to t15 corresponds to the execution period of the brake holding control. In short, the execution period of the brake holding control is not only the period during which the brake holding torque is actually generated (the period from time t14 to t15 in the example shown in FIG. 5B) but also a period to prepare for generating the brake holding torque (the period from time t0 to t14 in the example shown in FIG. 5B).

From time t13 to t15 shown in FIG. 5A, the vehicle speed V of the host vehicle is maintained at zero (stop state). In this event, the engine speed ENG_Ne maintains a zero state (driving stop state of the engine 73). Likewise, the driving torque DRV_TRQ of the engine 73 also maintains a zero state. The IS control state transits from the OFF state to the ON state at time t13, and then maintains the ON state at time t13 to t15. The IS prohibition flag transits from the prohibited state to the permitted state at time t13, and then maintains the permitted state from time t13 to t15.

At time t13 to t15 shown in FIG. 5B, the brake operation state BRK maintains the ON state at time t13 to t14, transits from the ON state to the OFF state at time t14, and then maintains the OFF state at time t14 to t15. The braking torque DRV_TRQ maintains a value exceeding the critical braking torque value BTRQ_0. The brake holding state BH_SET is maintained in the ON setting state. The acceleration degree ACL is maintained in the OFF state.

There is one thing to be noted at time t14 shown in FIG. 5B. That is, the engine 73 is not restarted (the restart condition is not satisfied: see FIG. 5B) even though the brake operation state BRK transits from the ON state to the OFF state at time t14. This is because, if the transition of the brake operation state BRK from the ON state to the OFF state (the foot coming off the brake pedal; brake operation canceled) is adopted as the restart condition for the engine 73, the chance to execute the brake holding control (triggered by the cancellation of the brake operation) is prevented by the restart of the engine 73.

In short, when the brake holding state BH_SET is in the ON setting state, the transition of the brake operation state BRK from the ON state to the OFF state (cancellation of the brake operation) is excluded from the restart condition for the engine 73.

After time t15 shown in FIG. 5A, the vehicle speed V of the host vehicle linearly and gradually increases from zero (stop state) to around the vehicle speed threshold Vis, starting from the time shortly after time t15. In this event, the engine speed ENG_Ne rapidly increases from zero to the idling speed IDL_Ne immediately after time t15, and then linearly and gradually increases to a value exceeding the idling speed IDL_Ne. Likewise, the drive torque DRV_TRQ of the engine 73 also rapidly increases from zero to the creep torque CR_TRQ immediately after time t15, and then linearly and gradually increases to a value exceeding the creep torque CR_TRQ. The IS control state transits from the ON state to the OFF state at time t15 and then maintains the OFF state. The IS prohibition flag transits from the permitted state to the prohibited state at time t15, and then maintains the prohibited state.

After time t15 shown in FIG. 5B, the brake operation state BRK maintains the OFF state. The braking torque DRV_TRQ rapidly decreases from a value exceeding the critical braking torque value BTRQ_0 to zero at time t15, and then maintains zero. The brake holding state BH_SET transits from the ON state to the OFF state at time t15, and then maintains the OFF state. The acceleration degree ACL linearly and gradually increases from zero (stop state) starting from time t15.

There is one thing to be noted after time t15 shown in FIGS. 5A and 5B. That is, at time t15, the engine 73 is restarted with the increase in acceleration degree ACL (accelerator pedal depression operation) as a trigger (the restart condition is satisfied: see FIG. 5B) and the execution of the brake holding control is canceled (the brake operation state BRK transits from the ON state to the OFF state: see FIG. 5B).

The increase in acceleration degree ACL (accelerator pedal depression operation) is an index that notably represents the driver's intention to start, and is suitable as a trigger for restarting the engine 73 and canceling the execution of the brake holding control.

Next, with reference to FIGS. 6A and 6B, description is given of a time-series operation of the vehicle control apparatus 11 when the brake holding (BH) control function is subsequently switched from OFF to ON (Example).

Figure 6B:
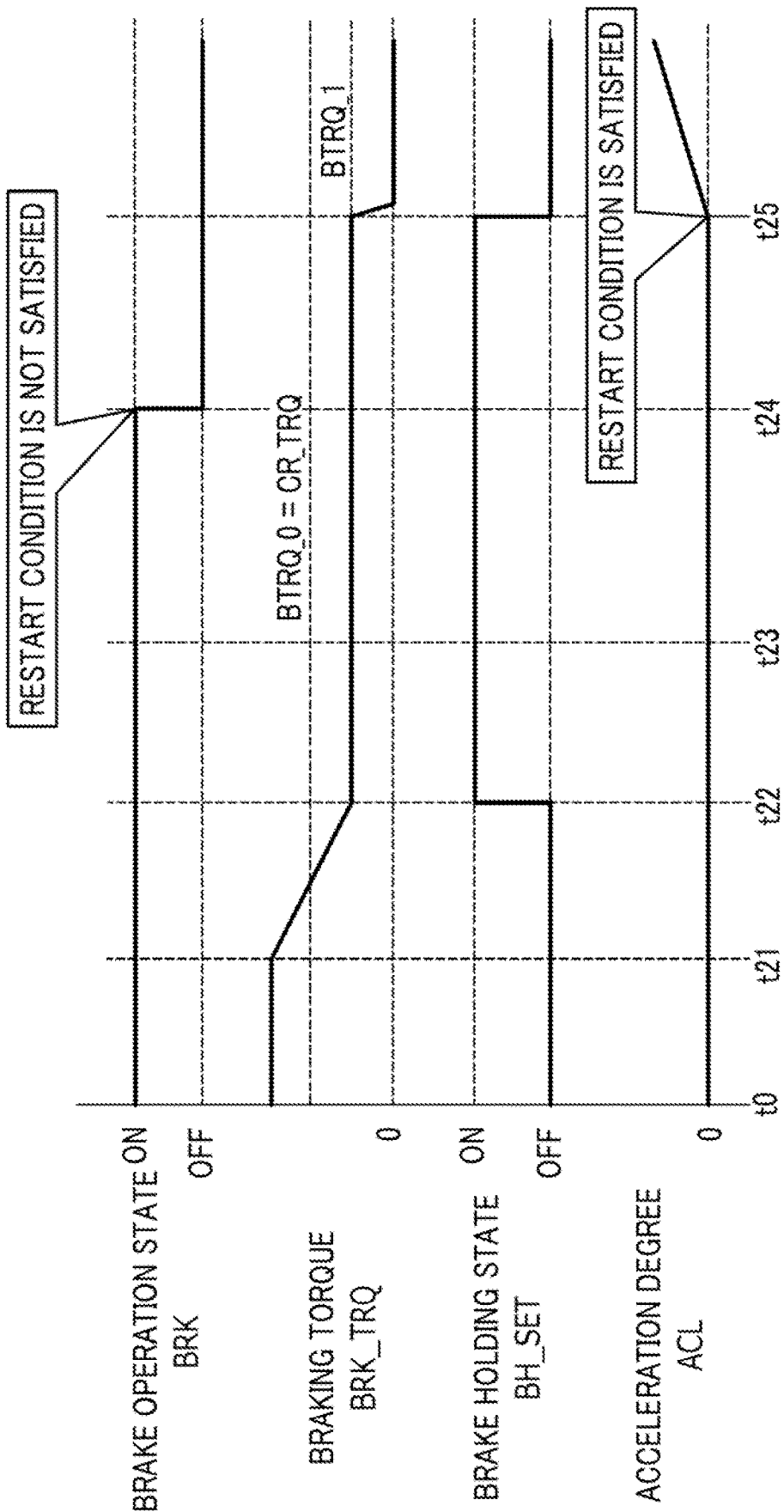
FIG. 6B is a time chart showing temporal changes in brake operation state, braking torque, brake holding state, and acceleration degree, for explaining the operations of the vehicle control apparatus when the brake holding control function is switched from OFF to ON (Example).

FIGS. 6A and 6B are time charts showing temporal changes in vehicle speed V, engine speed ENG_Ne, driving torque DRV_TRQ, IS control state, IS prohibition flag, brake operation state BRK, braking torque BRK_TRQ, brake holding state BH_SET, and acceleration degree ACL, respectively, for explaining the operation of the vehicle control apparatus 11 when the brake holding (BH) control function is subsequently switched from OFF to ON (Example).

At time t0 to t21 shown in FIG. 6A, the vehicle speed V of the host vehicle linearly and gradually decreases from a value exceeding the vehicle speed threshold Vis to a low vehicle speed range with the vehicle speed threshold Vis as the upper limit. In this event, the engine speed ENG_Ne maintains the idling speed IDL_Ne. The driving torque DRV_TRQ of the engine 73 maintains the creep torque CR_TRQ. The IS control state is in the OFF state. The IS prohibition flag is in the prohibited state.

At time t0 to t21 shown in FIG. 6B, the brake operation state BRK is in the ON state (state where the brake pedal is depressed). The braking torque DRV_TRQ maintains a value exceeding the critical braking torque value BTRQ_0 (=creep torque CR_TRQ) that matches with the creep torque CR_TRQ. The brake holding state BH_SET is in the OFF setting state. The acceleration degree ACL is in the OFF state (state where the accelerator pedal is not depressed).

At time t21 to t23 shown in FIG. 6A, the vehicle speed V of the host vehicle linearly and gradually decreases until the vehicle speed reaches zero (stop state) at time t23 even after entering the low vehicle speed range with the vehicle speed threshold Vis as the upper limit at time t21. In this event, the engine speed ENG_Ne rapidly decreases from the idling speed IDL_Ne to zero immediately after time t21, and then maintains the zero state (state where the driving of the engine 73 is stopped). Likewise, the drive torque DRV_TRQ of the engine 73 also rapidly decreases from the creep torque CR_TRQ to zero immediately after time t21, and then maintains the zero state. The IS control state transits from the OFF state to the ON state at time t21, and then maintains the ON state at time t21 to t23. The IS prohibition flag transits from the prohibited state to the permitted state at time t21, and then maintains the permitted state from time t21 to t23.

From time t21 to t23 shown in FIG. 6B, the brake operation state BRK is maintained in the ON state. After the braking torque DRV_TRQ linearly and gradually decreases from a value exceeding the critical braking torque value BTRQ_0 to an intermediate braking torque value BTRQ_1 below the same value BTRQ_0 at time t21 to t22, the intermediate braking torque value BTRQ_1 is maintained. The brake holding state BH_SET transits from the OFF state to the ON state at time t22, and then maintains the ON setting state from time t22 to t23. The acceleration degree ACL is maintained in the OFF state.

Here, there are three things to be noted at time t21 to t23.

First, on the premise that the brake operation state BRK is ON (state where the brake pedal is depressed), the low vehicle speed traveling IS control is executed with the vehicle speed V during deceleration entering the low vehicle speed range (vehicle speed V<vehicle speed threshold Vis) as a trigger at time t21. In the example shown in FIG. 6A, the period from time t21 to t23 corresponds to the execution period of the low vehicle speed traveling IS control.

Secondly, the IS control state transits from the OFF state to ON state at time t21, and then the ON state is maintained from time t21 to t23. Such an action is realized by the IS prohibition flag being in the permitted state at the same time t21 to t23. Note that, at time t21, the IS prohibition flag transits from the prohibited state to the permitted state because the brake holding state BH_SET is in the OFF setting state and, as described above, the vehicle speed V during deceleration enters the low vehicle speed range at time t21.

Thirdly, at time t22, the brake holding (BH) control function is subsequently switched from OFF to ON. To be more specific, the brake holding state BH_SET transits from the OFF state to the ON state at time t22, and then the ON state is maintained at time t22 to t23. Such an action is realized by the driver of the host vehicle or the like performing a setting operation to turn on the BH operation switch 42.

From time t23 to t25 shown in FIG. 6A, the vehicle speed V of the host vehicle is maintained at zero (stop state). In this event, the engine speed ENG_Ne maintains a zero state (driving stop state of the engine 73). Likewise, the drive torque DRV_TRQ of the engine 73 also maintains a zero state. The IS control state is maintained in the ON state. The IS prohibition flag maintains the permitted state.

From time t23 to t25 shown in FIG. 6B, the brake operation state BRK maintains the ON state at time t23 to t24, transits from the ON state to the OFF state at time t24, and then maintains the off state at time t24 to t25. The braking torque DRV_TRQ maintains an intermediate braking torque value BTRQ_1. The brake holding state BH_SET is maintained in the ON setting state. The acceleration degree ACL is maintained in the OFF state.

There is one thing to be noted at time t24 shown in FIG. 6B. That is, the engine 73 is not restarted (the restart condition is not satisfied: see FIG. 6B) even though the brake operation state BRK transits from the ON state to the OFF state at time t24. This is because, if the transition of the brake operation state BRK from the ON state to the OFF state (the foot coming off the brake pedal; brake operation canceled) is adopted as the restart condition for the engine 73, the chance to execute the brake holding control (triggered by the cancellation of the brake operation) is prevented by the restart of the engine 73.

In short, when the brake holding state BH_SET is in the ON setting state, the transition of the brake operation state BRK from the ON state to the OFF state (cancellation of the brake operation) is excluded from the restart condition for the engine 73.

After time t25 shown in FIG. 6A, the vehicle speed V of the host vehicle linearly and gradually increases from zero (stop state) to around the vehicle speed threshold Vis, starting from the time shortly after time t25. In this event, the engine speed ENG_Ne rapidly increases from zero to the idling speed IDL_Ne immediately after time t25, and then linearly and gradually increases to a value exceeding the idling speed IDL_Ne. Likewise, the drive torque DRV_TRQ of the engine 73 also rapidly increases from zero to the creep torque CR_TRQ immediately after time t25, and then linearly and gradually increases to a value exceeding the creep torque CR_TRQ. The IS control state transits from the ON state to the OFF state at time t25 and then maintains the OFF state. The IS prohibition flag transits from the permitted state to the prohibited state at time t25, and then maintains the prohibited state.

After time t25 shown in FIG. 6B, the brake operation state BRK maintains the OFF state. The braking torque DRV_TRQ rapidly decreases from the intermediate braking torque value BTRQ_1 to zero at time t25, and then maintains zero. The brake holding state BH_SET transits from the ON state to the OFF state at time t25, and then maintains the OFF state. The acceleration degree ACL linearly and gradually increases from zero (stop state) starting from time t25.

There is one thing to be noted after time t25 shown in FIGS. 6A and 6B. That is, at time t25, the engine 73 is restarted with the increase in acceleration degree ACL (accelerator pedal depression operation) as a trigger (the restart condition is satisfied: see FIG. 6B) and the execution of the brake holding control is canceled (the brake operation state BRK transits from the ON state to the OFF state: see FIG. 6B).

The increase in acceleration degree ACL (accelerator pedal depression operation) is an appropriate index representing the driver's intention to start, and is suitable as a trigger for restarting the engine 73 and canceling the execution of the brake holding control.

[Advantageous Effects of Vehicle Control Apparatus 11 According to Embodiment of the Present Invention]

Next, description is given of advantageous effects of the vehicle control apparatus 11 according to the embodiment of the present invention.

The vehicle control apparatus 11 based on the first aspect includes: the VSA-ECU 51 and the ESB-ECU 55 (brake control unit) that perform the brake control to apply a braking torque according to a brake operation by the driver of the host vehicle, and hold the braking torque even when the brake operation is cancelled; and the engine control unit 69 that performs idling stop control to stop the driving of the engine 73 that is the drive source of the host vehicle by satisfying the stop condition including that the vehicle speed of the host vehicle enters the predetermined low vehicle speed range, and performs restart control to restart the engine 73 when the predetermined restart condition is satisfied. The engine control unit 69 employs a configuration that prohibits the execution of the idling stop control during execution of the brake holding control.

As a premise, both the brake holding request based on the brake holding control and the restart request of the engine 73 require relatively large electric power to meet the requests. Therefore, when one power source 43 mounted on the host vehicle is shared for the power source 43 used to perform the deceleration control and the power source 43 used to perform the restart control and when the brake holding request and the restart request are generated redundantly, the remaining capacity of the power source 43 is insufficient to meet either one of the requests, which may cause the occupants to feel uncomfortable.

In this respect, in the vehicle control apparatus 11 based on the first aspect, the driving of the engine 73 is not stopped during the execution of the brake holding control since the engine control unit 69 prohibits the execution of the idling stop control during the execution of the brake holding control. Therefore, the brake holding request based on the brake holding control and the restart request of the engine 73 are not generated redundantly.

The vehicle control apparatus 11 based on the first aspect can realize smooth vehicle control without making the occupants feel uncomfortable by suppressing a situation where the brake holding request based on the brake holding control and the restart request for the engine 73 are generated redundantly. In addition, since the total load on the power source 43 can be suppressed, a secondary effect of reducing the rated capacity of the power source 43 (reducing the weight of the power source 43) can also be expected.

Furthermore, there is a case where it is desirable to cruise around the low vehicle speed range while performing speed adjustment when traveling in a traffic jam, for example. In such a case, if the low vehicle speed traveling IS control is frequently performed, speed adjustment using the creep torque CR_TRQ of the engine 73 cannot be performed, which is rather troublesome.

In this respect, the execution of the brake holding control having the effect of reducing the load involved with the brake operation during traveling in a traffic jam prohibits the low vehicle speed traveling IS control. Therefore, it can also be expected to resolve the troublesomeness from the frequent execution of the low vehicle speed traveling IS control.

The vehicle control apparatus 11 based on the second aspect is the vehicle control apparatus 11 based on the first aspect, which may adopt a configuration in which the brake holding control is executed with on setting operation using the BH operation switch (brake holding operation member) 42 provided in the host vehicle as a trigger. However, execution of the brake holding control is a concept including not only an operation to actually generate the brake holding torque but also an operation to prepare for generating the brake holding torque.

According to the vehicle control apparatus 11 based on the second aspect, the brake holding control is executed with the on setting operation using the BH operation switch (brake holding operation member) 42 provided in the host vehicle as a trigger. Therefore, it is possible to secure the execution of the brake holding control reflecting the driver's intention.

Furthermore, the vehicle control apparatus 11 based on the third aspect is the vehicle control apparatus 11 based on the first aspect, wherein the engine control unit 69 may be configured to permit the execution of the idling stop control when the host vehicle is in the stop state.

According to the vehicle control apparatus 11 based on the third aspect, the engine control unit 69 permits the execution of the idling stop control (IS control when the vehicle is stopped) when the vehicle is stopped. Therefore, the effect of appropriately adjusting the execution timing of the idling stop control can be expected, such as executing the IS control when the vehicle is stopped by adjusting the depression operation amount of the brake pedal to the depression side after the host vehicle is stopped.

The vehicle control apparatus 11 based on the fourth aspect is the vehicle control apparatus 11 based on the first aspect, wherein the engine control unit 69 may be configured to execute idling stop control when a stop condition including that the vehicle speed of the host vehicle enters the low vehicle speed range is satisfied during non-execution of brake holding control without the ON setting operation using the BH operation switch (brake holding operation member) 42, and continuously executes the idling stop control when the brake holding control is subsequently executed by performing the ON setting operation using the BH operation switch (brake holding operation member) 42 before the host vehicle is set in the stop state.

In the vehicle control apparatus 11 based on the fourth aspect, the engine control unit 69 performs the idling stop control when the stop condition including that the vehicle speed of the host vehicle enters the low vehicle speed range is satisfied during non-execution of the brake holding control. That is, during non-execution of the brake holding control, the idling stop control can be performed during low vehicle speed traveling without waiting for the host vehicle to stop.

Further, the engine control unit 69 performs the ON setting operation using the BH operation switch 42 during execution of the idling stop control (while the driving of the engine 73 is stopped) and before the host vehicle is set in the stop state. Therefore, the idling stop control is continuously executed when the brake holding control is subsequently executed. That is, when the brake holding control is subsequently executed during execution of the idling stop control and before the host vehicle is set in the stop state, the idling stop control can be continuously executed (the driving stop state of the engine 73 can be continued).

According to the vehicle control apparatus 11 based on the fourth aspect, during non-execution of the brake holding control, the idling stop control is executed during low vehicle speed traveling. Meanwhile, when the brake holding control is subsequently executed during execution of the idling stop control and before the host vehicle is set in the stop state, the idling stop control is continuously executed.

Therefore, fuel saving, emission reduction, vibration noise reduction, and the like can be realized as much as possible.

Further, the vehicle control apparatus 11 based on the fifth aspect is the vehicle control apparatus 11 based on the fourth aspect, wherein the engine control unit 69 may be configured to permit execution of restart control even when the brake holding control is subsequently executed by performing the on setting operation using the BH operation switch (brake holding operation member) 42 during execution of the idling stop control and before the host vehicle is set in the stop state.

According to the vehicle control apparatus 11 based on the fifth aspect, the execution of the restart control is permitted if the predetermined restart condition is satisfied, even when the brake holding control is subsequently executed during execution of the idling stop control and before the host vehicle is set in the stop state. Therefore, it is possible to secure the execution of the vehicle control that appropriately reflects the driving intention of the driver to start.

Further, the vehicle control apparatus 11 based on the sixth aspect is the vehicle control apparatus 11 based on the first aspect, wherein the engine control unit 69 may be configured to exclude cancelation of brake operation from the predetermined restart condition when the host vehicle is set in the stop state and during execution of the brake holding control.

Further, according to the vehicle control apparatus 11 based on the sixth aspect, cancelation of brake operation is excluded from the predetermined restart condition when the host vehicle is set in the stop state and during execution of the brake holding control. Therefore, the chance to execute the brake holding control (triggered by the cancelation of the brake operation) is not prevented by the restart of the engine 73. Thus, it is possible to secure the execution of the vehicle control that reflects the driver's intention.

In addition, a vehicle based on the seventh aspect includes the vehicle control apparatus 11 based on any one of the first to sixth aspects.

The vehicle based on the seventh aspect can realize smooth vehicle control without making the occupants feel uncomfortable by suppressing a situation where the brake holding request based on the brake holding control and the engine restart request are redundantly generated.

OTHER EMBODIMENTS

The plurality of embodiments described above show examples of implementation of the present invention. Therefore, these should not be construed as limiting the technical scope of the present invention. The present invention can be implemented in various forms without departing from the scope or main features of the present invention.

For example, in the description of the vehicle control apparatus 11 according to the embodiment of the present invention, the description is given of an example where the brake holding control unit 65 of the VSA-ECU 51 is assigned with the function to perform the brake holding control to hold the braking torque even when the brake operation (brake pedal depression operation) is canceled. However, the present invention is not limited to this example.

The present invention may adopt a configuration in which the vehicle control apparatus 11 itself, instead of the brake holding control unit 65 of the VSA-ECU 51, is assigned with the function to perform the brake holding control to hold the braking torque even when the brake operation is canceled. In this case, the vehicle control apparatus 11 itself corresponds to the "brake control unit" of the present invention.

Further, in the description of the vehicle control apparatus according to the embodiment of the present invention, the description is given of an example where the engine control unit 69 of the ENG-ECU 53 is assigned with the function to perform the idling stop control to permit or prohibit stopping of driving of the engine 73. However, the present invention is not limited to this example.

The present invention may adopt a configuration in which the vehicle control apparatus 11 itself, instead of the engine control unit 69 of the ENG-ECU 53, is assigned with the function to perform the idling stop control to permit or prohibit stopping of driving of the engine 73. In this case, the vehicle control apparatus 11 itself corresponds to the "engine control unit" of the present invention.

Further, in the description of the vehicle control apparatus according to the embodiment of the present invention, the description is given of an example of realizing the functions according to the present invention by using the three ECUs, the VSA-ECU 51, the ENG-ECU 53, and the ESB-ECU 55 in cooperation. However, the present invention is not limited to this example.

The present invention may adopt a configuration in which the functions of the three ECUs, the VSA-ECU 51, the ENG-ECU 53, and the ESB-ECU 55, are integrated to realize the functions according to the present invention. Further, the present invention may also adopt a configuration in which the functions of the three ECUs, the VSA-ECU 51, the ENG-ECU 53, and the ESB-ECU 55, are further divided into a plurality of parts to realize the functions according to the present invention as a whole.

Further, in the description of the vehicle control apparatus 11 according to the embodiment of the present invention, the description is given of an example where the brake holding control unit 65 has the function to perform the brake holding control to continuously hold the braking torque when the host vehicle is stopped even when the brake operation is canceled. However, the present invention is not limited to this example.

The present invention may also adopt a configuration in which the brake holding control unit 65 has a function to perform the brake holding control to continuously hold the braking torque of a predetermined magnitude that is appropriately set, even when the brake operation is canceled. In this case, as for the preset magnitude of the braking torque, a braking torque value may be appropriately set, which exceeds the magnitude of the creep torque CR_TRQ of the engine 73 and takes into consideration the case where the host vehicle is stopped on a downhill road with less than a predetermined inclination angle.

Further, as the respective characteristic values in the description of the vehicle control apparatus 11 according to the embodiment of the present invention, the expressions such as linear and gradual decrease, linear and gradual increase, linear rapid decrease, and linear rapid increase are used for convenience. However, the present invention is not limited to this example.

The respective characteristic values in the description of the vehicle control apparatus 11 according to the embodiment of the present invention may be any value, besides non-linear and gradual decrease, non-linear and gradual increase, non-linear rapid decrease, and non-linear rapid increase.

Further, in the description of the operation of the vehicle control apparatus 11 when the brake holding (BH) control function is subsequently switched from OFF to ON (Example), the description is given of an example where the brake holding (BH) control function is switched from OFF to ON at time t22 before the host vehicle is stopped. However, the present invention is not limited to this example.

The present invention may be applied according to the example shown in FIGS. 6A and 6B even when the brake holding (BH) control function is switched from OFF to ON around time t23 to time t24 after the host vehicle is stopped.

Finally, in the description of the vehicle control apparatus according to the embodiment of the present invention, the description is given of an example of applying the present invention to a vehicle including the internal combustion engine 73 as a drive source. However, the present invention is not limited to this example.

The present invention may be applied to a hybrid vehicle including the internal combustion engine 73 and an electric motor as drive sources.

What is claimed is:

1. A vehicle control apparatus comprising:
a braking control unit that performs braking control to apply a braking torque in response to a brake operation by a driver of a host vehicle, wherein
the braking control unit also performs brake torque holding control to hold the braking torque even when the brake operation is cancelled by the driver; and
an engine control unit that performs idling stop control to stop driving of an engine when an engine stop condition is satisfied, the engine stop condition including a condition where a vehicle speed of the host vehicle is determined to be in a predetermined low vehicle speed region, wherein
the engine control unit also performs restart control to restart the engine when a predetermined restart condition is satisfied, wherein
the engine control unit does not perform the idling stop control when the brake torque holding control is being performed and the vehicle is determined to be in a predetermined low vehicle speed region, and wherein
the engine control unit also performs the idling stop control when the brake torque holding control is being performed and the vehicle is determined to be stopped.

2. The vehicle control apparatus according to claim 1, wherein when the driver manually operates a brake torque holding operation member provided in the vehicle the brake torque holding control is activated.

3. The vehicle control apparatus according to claim 1, wherein the engine control unit permits execution of the idling stop control when the host vehicle is set in a stop state.

4. The vehicle control apparatus according to claim 1, wherein the engine control unit executes the idling stop control when a stop condition including a condition where the vehicle speed of the host vehicle enters the low vehicle speed range is satisfied, during non-execution of a brake holding control without a setting operation using the brake holding operation member, and continuously executes the idling stop control when the brake holding control is subsequently executed by the setting operation using the brake holding operation member during execution of the idling stop control and before the host vehicle is set in a stop state.

5. The vehicle control apparatus according to claim 4, wherein the engine control unit permits the execution of the restart control even when the brake holding control is subsequently executed by a setting operation using the brake holding operation member during execution of the idling stop control and before the host vehicle is set in a stop state.

6. The vehicle control apparatus according to claim 1, wherein the engine control unit excludes cancelation of the brake operation from the predetermined restart condition when the host vehicle is set in a stop state and during execution of the brake holding control.

7. A vehicle comprising the vehicle control apparatus according to claim 1.

8. A vehicle comprising the vehicle control apparatus according to claim 2.

9. A vehicle comprising the vehicle control apparatus according to claim 3.

10. A vehicle comprising the vehicle control apparatus according to claim 4.

11. A vehicle comprising the vehicle control apparatus according to claim 5.

12. A vehicle comprising the vehicle control apparatus according to claim 6.

* * * * *